United States Patent
Reitano (12)

(10) Patent No.: US 6,304,667 B1
(45) Date of Patent: Oct. 16, 2001

(54) SYSTEM AND METHOD FOR INCORPORATING DYSLEXIA DETECTION IN HANDWRITING PATTERN RECOGNITION SYSTEMS

(76) Inventor: Carmen T. Reitano, 192 N. End Blvd., Salisbury, MA (US) 01952

( * ) Notice: Subject to any disclaimer, the term of this patent is extended or adjusted under 35 U.S.C. 154(b) by 0 days.

(21) Appl. No.: 09/598,577

(22) Filed: Jun. 21, 2000

(51) Int. Cl.[7] .................................................... G06K 9/68
(52) U.S. Cl. .......................... 382/128; 382/187; 382/217; 382/309
(58) Field of Search ................................ 382/128, 186, 382/187, 188, 189, 209, 215, 217, 218, 309, 310

(56) References Cited

U.S. PATENT DOCUMENTS

| | | | |
|---|---|---|---|
| 4,528,989 | * 7/1985 | Weinblatt | 600/558 |
| 4,764,973 | * 8/1988 | O'Hair | 382/229 |
| 4,889,422 | * 12/1989 | Pavlidis | 351/210 |
| 5,313,527 | 5/1994 | Guberman et al. . | |
| 5,467,407 | 11/1995 | Guberman et al. . | |
| 5,473,742 | 12/1995 | Polyakov et al. . | |
| 5,577,135 | 11/1996 | Gradjski et al. . | |
| 5,730,602 | * 3/1998 | Gierhart et al. | 343/155 |
| 5,748,769 | * 5/1998 | Nishimura et al. | 382/187 |
| 5,774,571 | * 6/1998 | Marshall | 382/119 |
| 5,796,410 | * 8/1998 | Baird | 382/215 |
| 5,825,920 | * 10/1998 | Kitamura | 382/178 |
| 5,889,889 | 3/1999 | Sinden . | |
| 5,940,534 | * 8/1999 | Wakahara et al. | 382/187 |
| 6,023,529 | 2/2000 | Ilan et al. . | |
| 6,213,956 | * 4/2001 | Lawton | 600/558 |
| 6,215,901 | * 4/2001 | Schwartz | 382/186 |

FOREIGN PATENT DOCUMENTS

WO 82/01613 * 5/1982 (US) .............................. G09B/17/00

OTHER PUBLICATIONS

Cresswell et al. "An Approach to the Diagnosis and Remediation of Developmental Dyslexia Using Microcomputers." IEE Colloguium on Computers in the Service of Mankind, Mar. 7, 1997, pp. 12/1–12/5.*

Gosselin. "Improved Hand–Written Character Recognition Thanks to a Geometric Distortion Method." 6th International Conference on Image Processing and Its Applications, vol. 1, Jul. 14, 1997, 327–331.*

* cited by examiner

*Primary Examiner*—Jon Chang
(74) *Attorney, Agent, or Firm*—Mark P. White

(57) ABSTRACT

A method for incorporating dyslexia detection into existing handwriting pattern recognition software includes a database of distorted characters along with the database of legitimate characters with which the handwriting samples are compared. The distorted characters are those recognized as typical of those produced by dyslexic persons. The system used may be a personal computer, a personal digital assistant, or an Internet system. Whatever system is used, a means of freehand drawing must be included, such as a stylus with pressure sensitive drawing area, a drawing tablet, or pen-pad-type device. A character is first presented to the student for reproduction. The student then draws a character on the pad, attempting to reproduce the character. The system software detects a correspondence between the character input and the legitimate characters, when occurring. When the drawn character does not correspond to a legitimate character, but does correspond to one of the distorted character sets, the result is stored, and later reported.

23 Claims, 9 Drawing Sheets

Name: Joe Doe  Date: 00/00/00  Age: 6  Grade:
  Test Series: Alpha 1Character Summary Report
Test Character: B

| ⌐B | ɓ | ʃ | f | ⌐ɔ | | | | | | |
|---|---|---|---|---|---|---|---|---|---|---|

Diagnosic evaluation of Perception of B:
Reversal: Y
Laterality: Y
Color:

Fig. 7

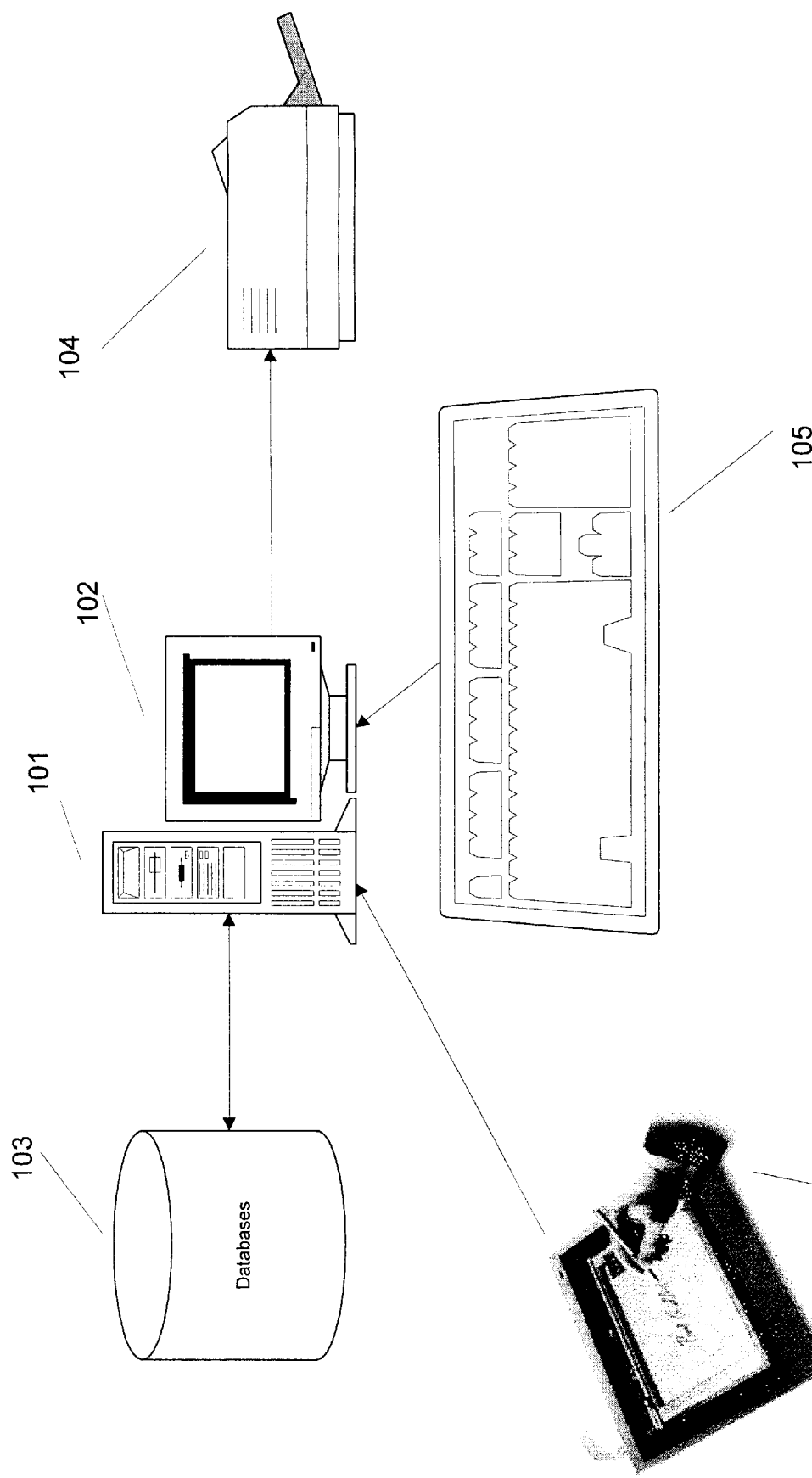

SYSTEM AND METHOD FOR INCORPORATING DYSLEXIA DETECTION IN HANDWRITING PATTERN RECOGNITION SYSTEMS

BACKGROUND OF THE INVENTION

1. Field of the Invention

The present invention relates to systems and methods for the detection of dyslexia, and more particularly to such systems and methods incorporated in existing handwriting pattern recognition systems 2. Description Related to the Prior Art Dyslexia is a specific learning difficulty that hinders the learning of literacy skills. Its etymology is based on the Greek: 'difficulty with words'. It affects millions of people worldwide.

Dyslexia affects reading, spelling, writing, memory and concentration, and sometimes math, music, foreign languages and self-organization It is apparently neurologically based and tends to run in families. Other symbolic systems, such as mathematics and musical notation, can also be affected. However, there is controversy as to the exact definition of the syndrome of dyslexia and from contradictory theories that surround its etiology.

There seems to be a consensus as to the need for early detection and treatment. The symptoms can be difficult to detect, however, especially at an early age. In pre-schoolers these symptoms may include the following[1]: THE DYSLEXIA INSTITUTE http://www.dyslexia-inst.org.uk Later than expected learning to speak clearly.

Jumbles phrases, e.g. 'cobbler's club' for 'toddler's club', 'teddy-dare' for 'teddybear'.

Quick 'thinker' and 'do-er'.

Use of substitute words or 'near misses'.

Mislabeling e.g. lampshade for lamp post.

A lisp—'duckth' for 'ducks'.

Inability to remember the label for known objects, e.g. colours.

Confused directional words, e.g. 'up/down' or 'in/out'.

Excessive tripping, bumping and falling over nothing.

Enhanced creativity—often good at drawing—good sense of colour.

Obvious 'good' and 'bad' days for no apparent reason.

Aptitude for constructional or technical toys, e.g. bricks, puzzles, lego blocks, control box for TV and video, computer keyboards.

Enjoys being read to but shows no interest in letters or words.

Difficulty learning nursery rhymes.

Finds difficulty with rhyming words, e.g. 'cat mat fat'.

Finds difficulty with odd-one-out, e.g. 'cat mat pig fat'.

Did not crawl—was a 'bottom shuffler'.

Difficulty with 'sequence'. e.g. coloured bead sequence.

Attempts to diagnose dyslexia generally fall into one of two categories: (1) generalized behavioral diagnoses, as in the list above, and (2) physiological tests involving detection of psychological and/or neurophysiological symptoms such as abnormal EEG or evoked potential and/or erratic eye movements.

Many of the patents in this area are of the latter type. U.S. Pat. No. 4,889,422, for instance, takes this approach, as do many others.

The current invention, on the other hand, is based on the well-known tendencies of dyslexics to perceive characters in unique ways, both in the perception of the characters, and in attempts to reproduce those characters by drawing the characters as they see them. Among these typical dyslexic misperceptions is the tendency to produce mirror images of characters.

This invention is implemented by means of the various handwriting recognition systems which are well developed and in wide use at the present time. These systems all have one characteristic in common: they compare a person's handwriting, character by character, to a library of acceptable or model characters, and reject those characters which do not conform to any recognized character model in the library.

The present invention expands this technique to include not only recognizable legitimate characters, but also illegitimate characters, such as the mirror images of legitimate characters. When the user of one of these handwriting recognition systems generates a significant number of these distorted characters, the invention records these in the memory associated with the handwriting recognition system, and creates a statistical profile of the errors, creating a warning that the user may be displaying characteristics associated with dyslexia.

This invention has the great advantage that it does not require any advances in the basic technology in handwriting analysis: it merely requires the expansion of the available character sets to include the models of distorted characters typically generated by dyslexics.

The current invention can be incorporated into simple word games currently available on computer and INTERNET systems for young children of pre-school and early school age, thus providing the early warning so urgently needed.

SUMMARY OF THE INVENTION

It is a general objective of the current invention to incorporate a dyslexia detection system into an existing handwriting recognition system.

In accordance with one aspect of the invention, a method for detecting dyslexia in a handwriting pattern recognition system, which includes a database of legitimate characters includes the steps of including in the database a set of distorted characters, then presenting a character to be input by a student, and inputting characters by the student. The method proceeds with the detecting of a correspondence between each input character and one of the distorted character, then determining a pattern of inputting of distorted characters, and finally, reporting the pattern.

In accordance with a second aspect of the invention, the set of distorted characters includes mirror images of the legitimate characters.

In accordance with a third aspect of the invention, each distorted character is associated with a legitimate character, and the reporting is done by means of statistical reporting of the distorted characters input.

In accordance with a fourth aspect of the invention, the set of distorted characters includes both a subset of global distorted characters and one or more subsets of local distorted characters.

In accordance with a fifth aspect of the invention, the subsets of local distorted characters are collected by statistical sampling methods from individual users, and a subset of local distorted characters is associated with each individual user.

In accordance with a sixth aspect of the invention, each distorted character is associated with a true character, and the true character is reported together with the distorted character detected.

In accordance with a final aspect of the invention, the database of distorted characters, the means for presenting a word to be input by a student, the means for inputting words containing characters by a student, the means for detecting a correspondence between each input character and one of the distorted characters, the means for determining a pattern of inputting of distorted characters, the means for detecting a pattern of selection of distorted characters in the words input, and the means for reporting said pattern are accomplished by either personal computers, by personal digital assistants, through means of computer games, or by a device communicating over a data communications network with an INTERNET server.

BRIEF DESCRIPTION OF THE DRAWINGS

These, and further features of the invention, may be better understood with reference to the accompanying specification and drawings depicting the preferred embodiment, in which:

FIG. 7 depicts a second reports screen summarizing the test results of a test series by a student.

FIG. 9 depicts the system used to implement the current invention.

DESCRIPTION OF THE PREFERRED EMBODIMENTS

Figure 1:
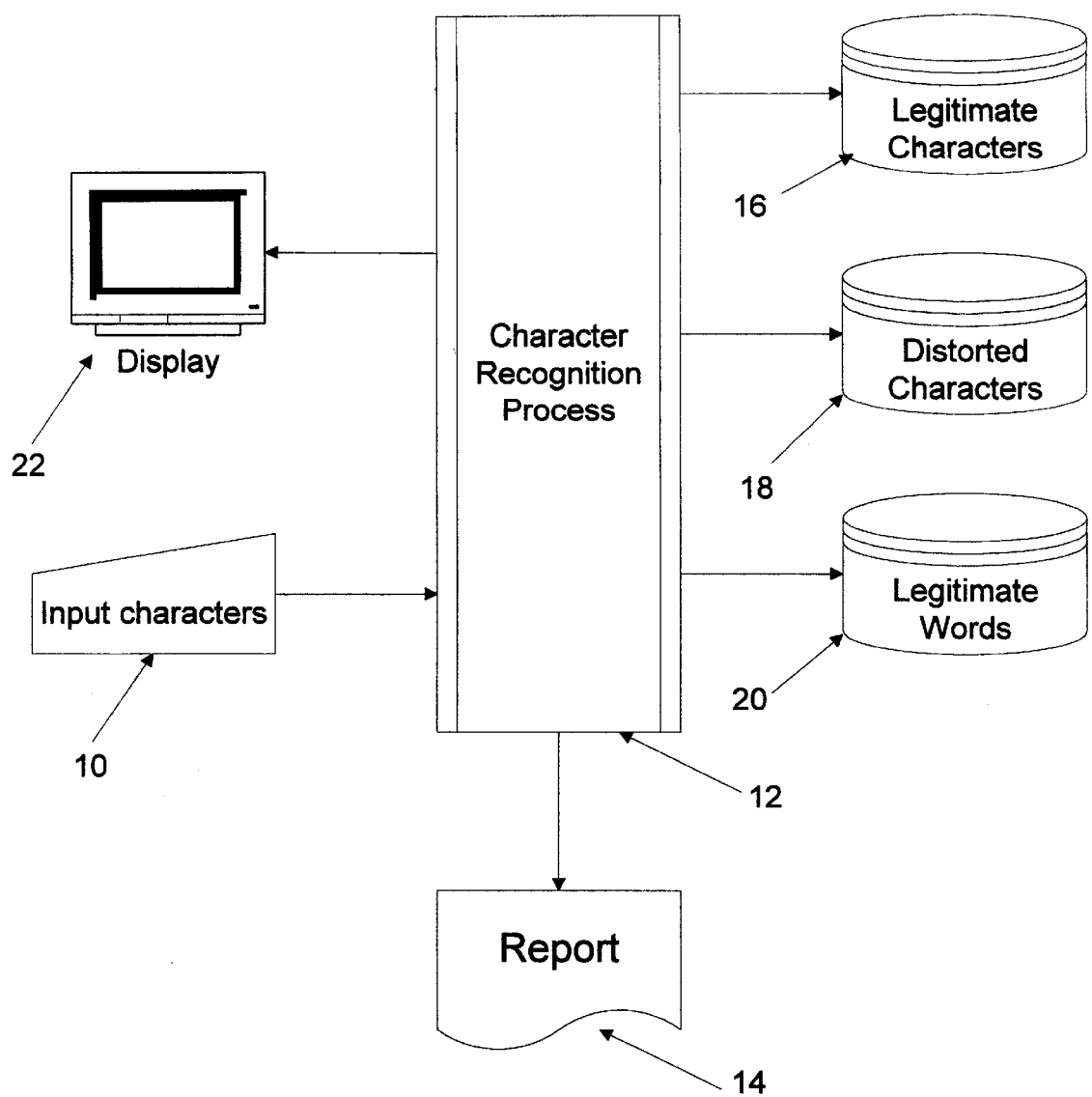
FIG. 1 depicts a block diagram of the system.

In the following descriptions, the term "handwriting" will be used to refer to both cursive and printed forms, and the invention described herein operates with both forms.

The current system is designed to detect, quantify, and catalog the symptoms of dyslexia at the earliest age of the person so afflicted. The system detects an individual's inability to see, recognize, and to faithfully reproduce characters of the alphabet. The cataloging of the failed attempts to recreate the target character results in the identification of specific characters which an individual is unable to recognize and recreate, and this data is then used to report individualized patterns of perceptual dysfunction The overriding principle in the current invention is to create a cyborg environment, made up of a man-machine system specifically designed and configured to allow man/machine interaction in order to provide character-specific visual evidence of a person's personal perceptual dysfunction.

In one of the basic implementations, as shown in FIG. 9, a system containing the current invention includes a computer 101, a monitor 102, and a printer 104. The computer software, including the handwriting analysis software, resides on the computer. A keyboard 105 provides a standard input to control the system. A sketch pad 106 is electronically connected to the computer, and provides the means for the user to supply handwritten input to the computer. The database 103 contain the libraries of characters described hereinafter may be contained within the computer 101, or may be external to the computer.

The present invention may be implemented by a number of electronics means. Besides the personal computer system shown in FIG. 9, they include the Personal Digital Assistant, such as the PalmPilot™[2], a new variety of NET appliances, or other devices specifically designed for teaching handwriting to children and illiterate adults. The invention may further be implemented as an interactive application running on the INTERNET, and accessed either by a personal computer, or by an electronic device specially manufactured to access the INTERNET, including cell phones The system is shown in its most basic form in FIG. 1. The system requires a display 22, which shows a student the character or words to be emulated. These characters or words are input to the system by some device 10, which may be a pen input device to a PC. Such devices include pen/pad inputs sold by Aiptek, Inc., and by WACOM, Inc. Alternatively, the input may be accomplished by use of a stylus and a pressure-sensitive surface, as used in a variety of personal digital assistants, or PDAs, including the PalmPilot™ series.

Still referring to FIG. 1, a character recognition process 12 interprets the input by one of a number of well-developed character recognition means. In the prior art, the manually input character would be compared against a database 16 of legitimate characters. In the more sophisticated handwriting input programs, the comparison is contextual; that is, the characters are identified as possibly being one of several different legitimate candidate characters. Then, words using the identified characters are compared to a database 20 dictionary of legitimate words to determine which of the most likely candidates characters produce legitimate words.

Figure 4:
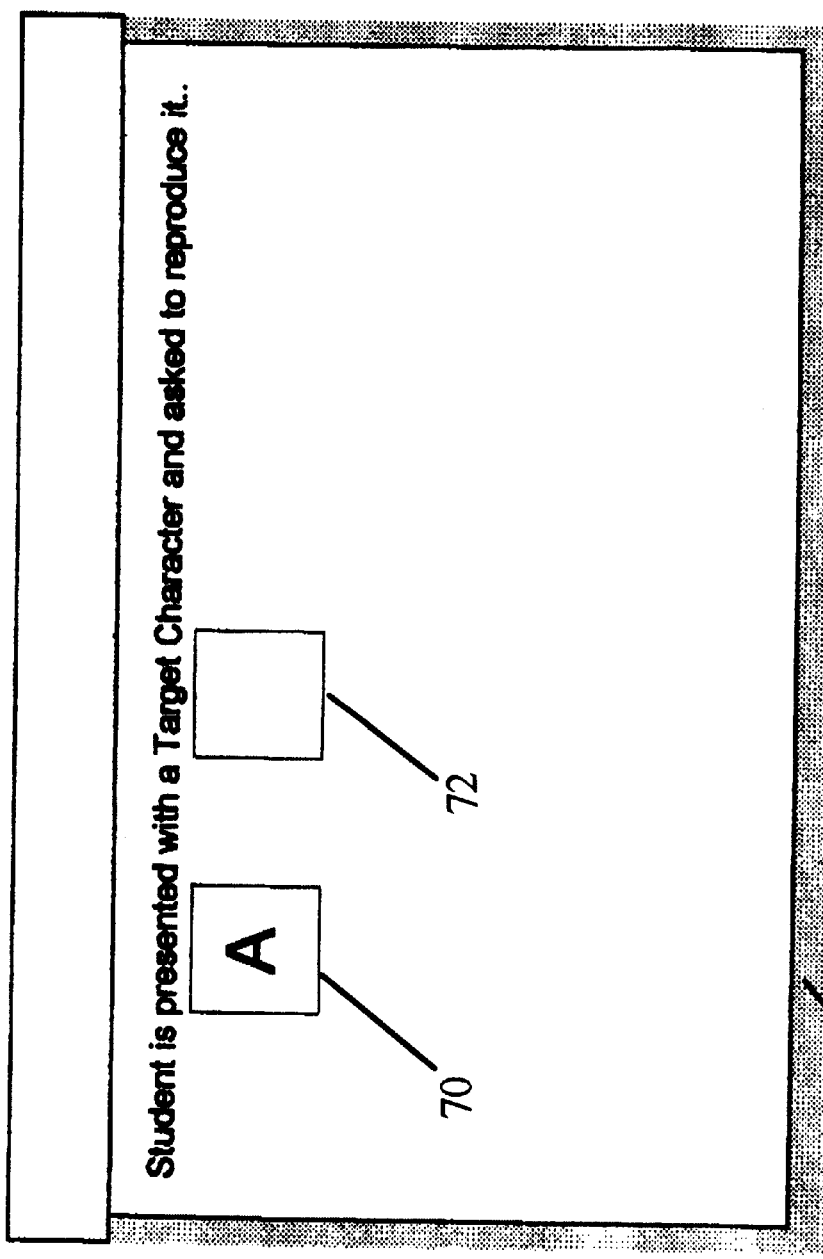
FIG. 4 depicts input screen of a simple user interface for the present invention.

In the current invention, however, the input characters are also compared to a database 18 of distorted characters. These distorted characters consists of the common variations that a dyslexic person produces when attempting to write certain characters. In addition, the database of distorted characters will also contain links to the legitimate characters that these distorted characters represent. Typical distortions of this nature are shown in FIG. 4.

Figure 2:
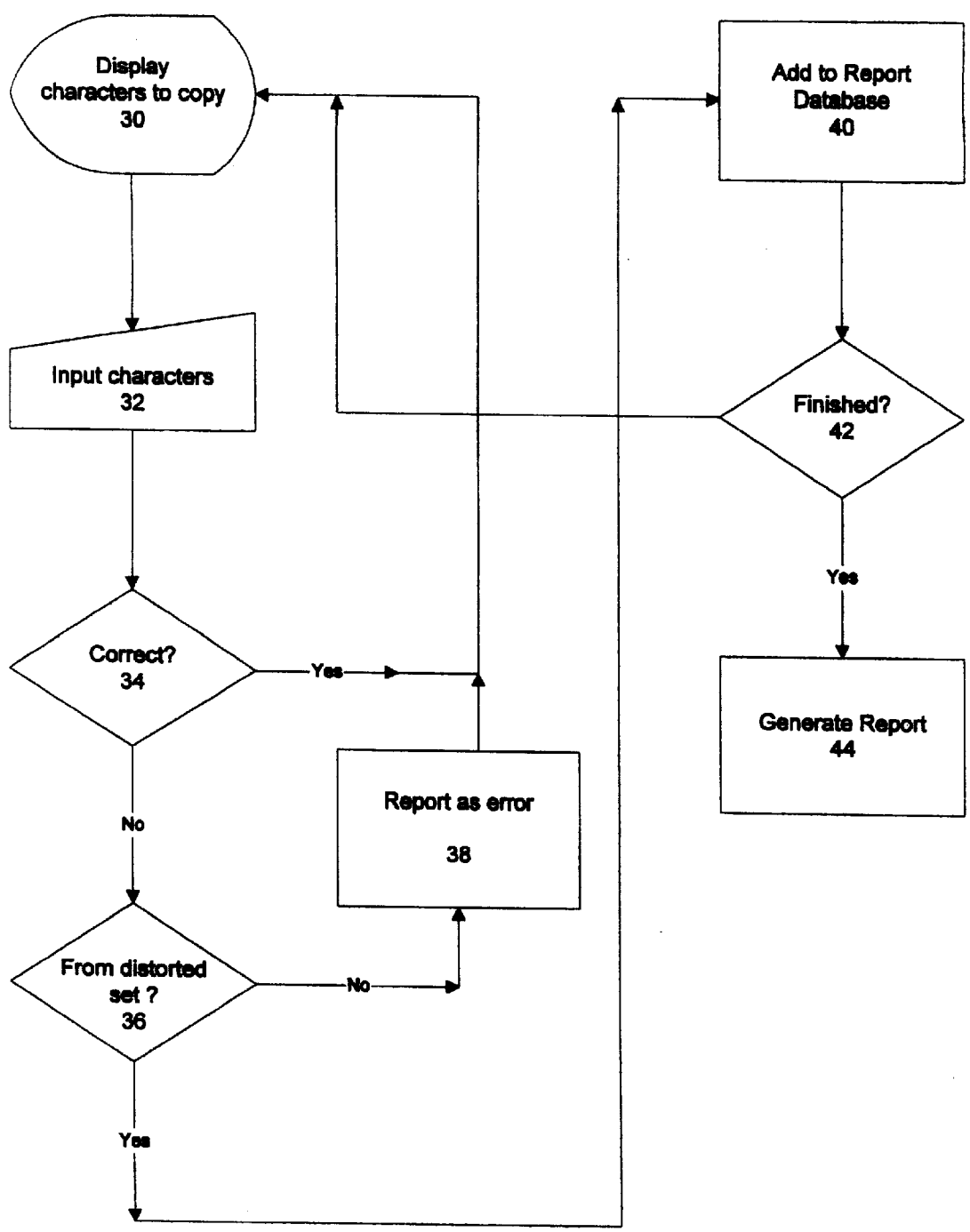
FIG. 2 depicts a flow chart of the first preferred embodiment of the present invention.

In its simplest implementation, the process proceeds according to the steps shown in the flow chart of FIG. 2. The process starts by displaying a character to copy 30. In a PC-based system the display is done on the monitor. The student then inputs the character 32 shown on the screen, attempting to reproduce it correctly. The system next determines 34 whether the character input was the character displayed, within the limits of the handwriting analysis software of the prior art. If the exemplar input by the student is correct, the process continues by notifying the student that his input was correct, and then proceeding to display 30 a new character to copy.

If, however, the input character was not recognized as one of the legitimate character set, then the input character is then tested 36 to determine whether the input character was one of the distorted character set. If not, then the input is simply reported 38 as an error, and is added to an error data base as well for subsequent statistical reporting. However, if the character input is one of the distorted character set, a special entry is made 40 to the report database for subsequent output. It should be noted that all errors are recorded for subsequent analysis.

The process then tests 42 for completion, and will recycle to the beginning with a new display 30 of a character to copy until a termination 42 is finally indicated, at which time a report 44 is generated.

The final report will typically indicate how many characters were input, how many general errors occurred, and how many distorted characters were generated. The report should further indicate which legitimate characters resulted in the student's inputting which distorted characters In the preferred embodiment, these reports will not be automatically output to the student. Rather, the reports will be stored internally in the computer, PDA, or other device, where they can be output later by those monitoring the student progress.

In a further variation of this preferred embodiment, the distorted characters will not be contained within a separate database, but will be generated on the fly by a separate process. For instance, a common type of distortion perceived, and generated by those suffering from dyslexia is a mirror image distortion.

Thus, still referring to FIG. 2, the test of the input character against a distorted set 36 is implemented by taking a character from the legitimate set, creating the mirror image by data processing means, and then comparing the input character to the just-calculated mirror image.

It should be noted that this embodiment, as well as the one described below, may be implemented by means of a computer game format.

SIMPLE INTERFACE

A simplified user interface is shown in FIG. 4. The input screen 73 depicted in this figure may appear on a PC monitor, a PDA, or the like. The user is shown a character 70 to reproduce, in this case, the letter "A". The user is then asked to reproduce this character, by drawing, using a pen-type device. The user then attempts to draw the character in the input box 72.

Figure 5:
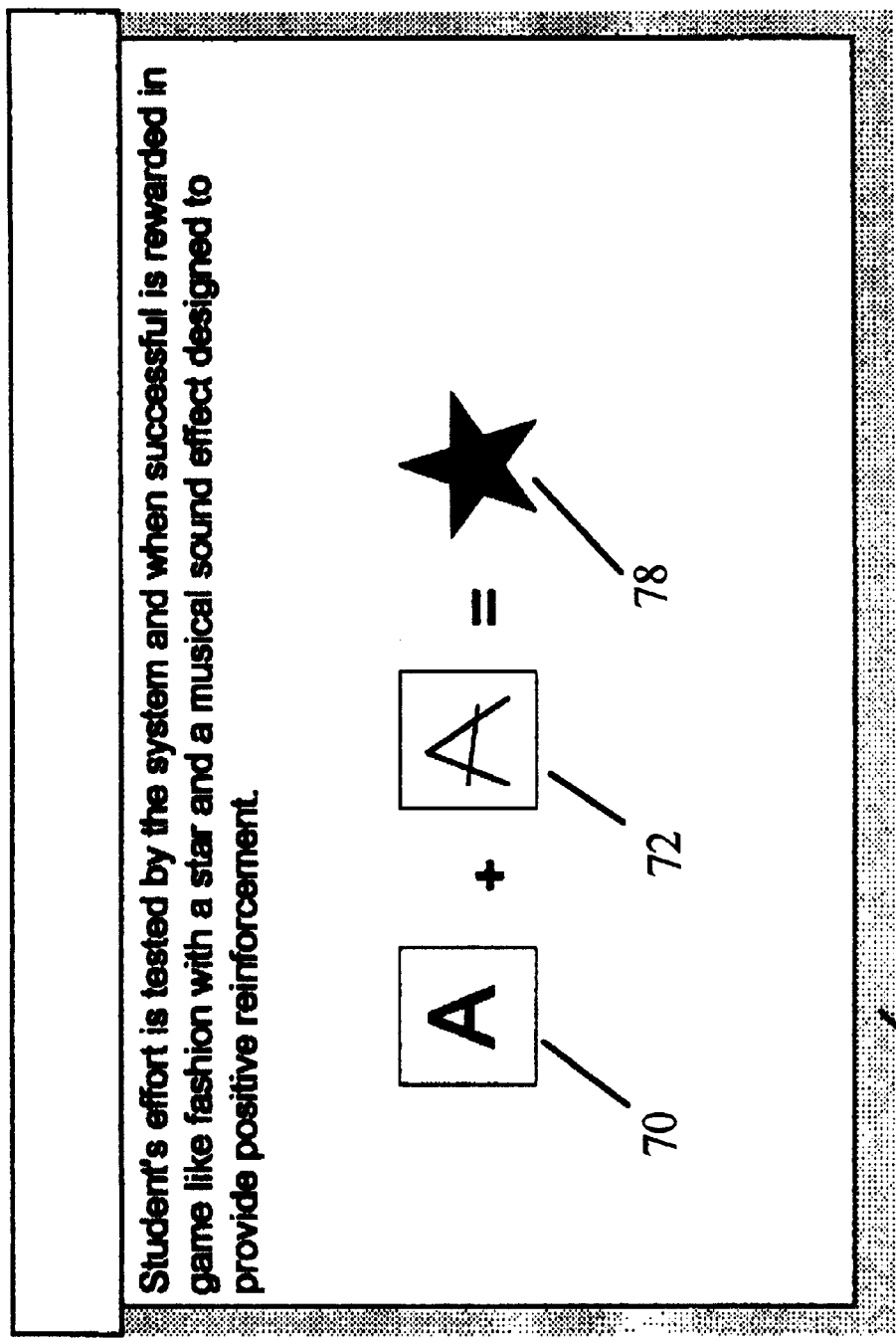
FIG. 5 depicts a successful result on the results screen of the simple user interface.

Referring now to FIG. 5, which shows a results screen 75 after the user has drawn an "A" in the input box 72. The system recognizes the drawn figure as acceptable, and rewards the user with a "star" in the result area 78, indicating that the input was correct.

Figure 8:
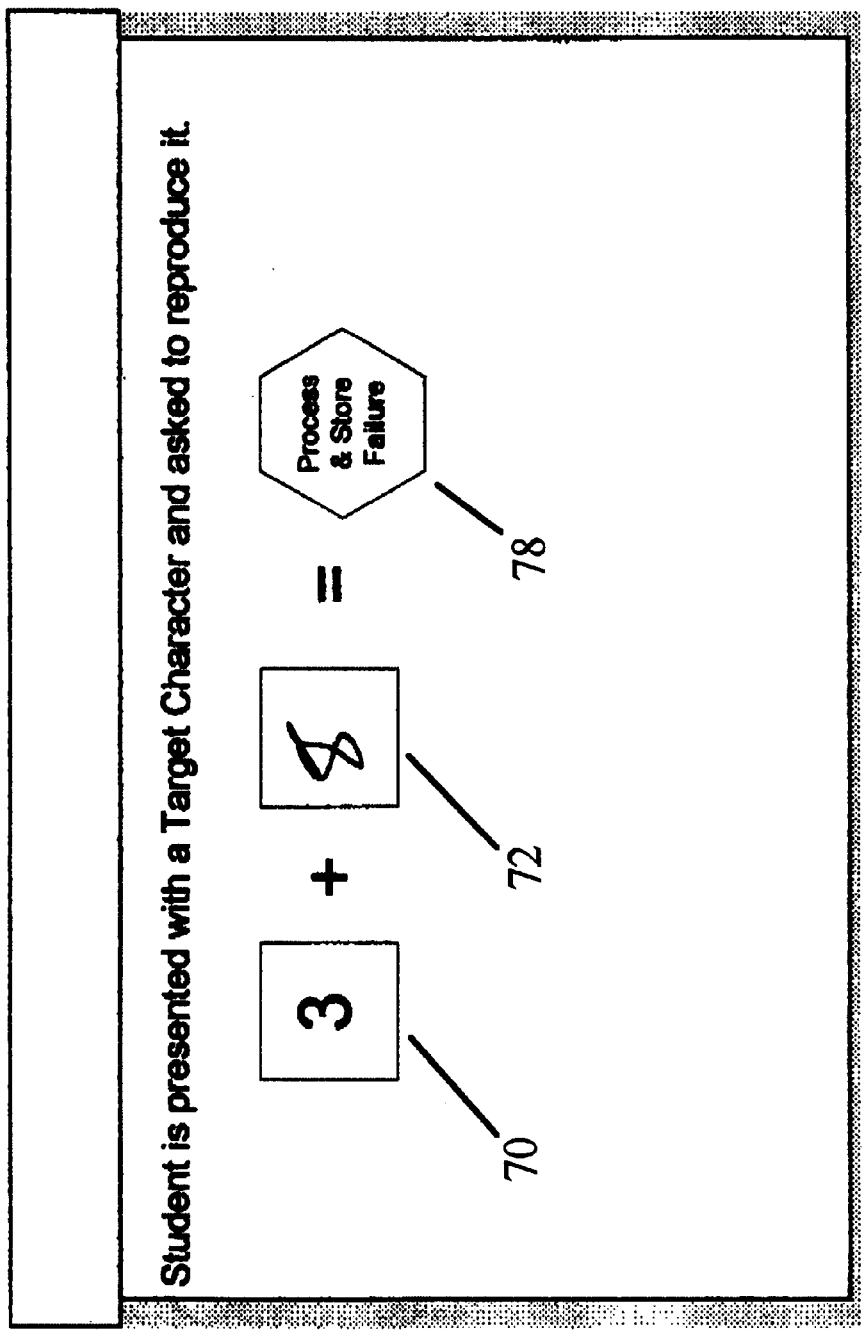
FIG. 8 depicts an unsuccessful result on the results screen of the simple user interface.

Referring now to FIG. 8, a results screen 75 is shown after the user has been presented with the number "3" in box 70. In this case, the user has drawn an incorrect character, resembling the number "8", in input box 72. As a result, the system produced a result 78 which signifies an incorrect input.

Figure 6:
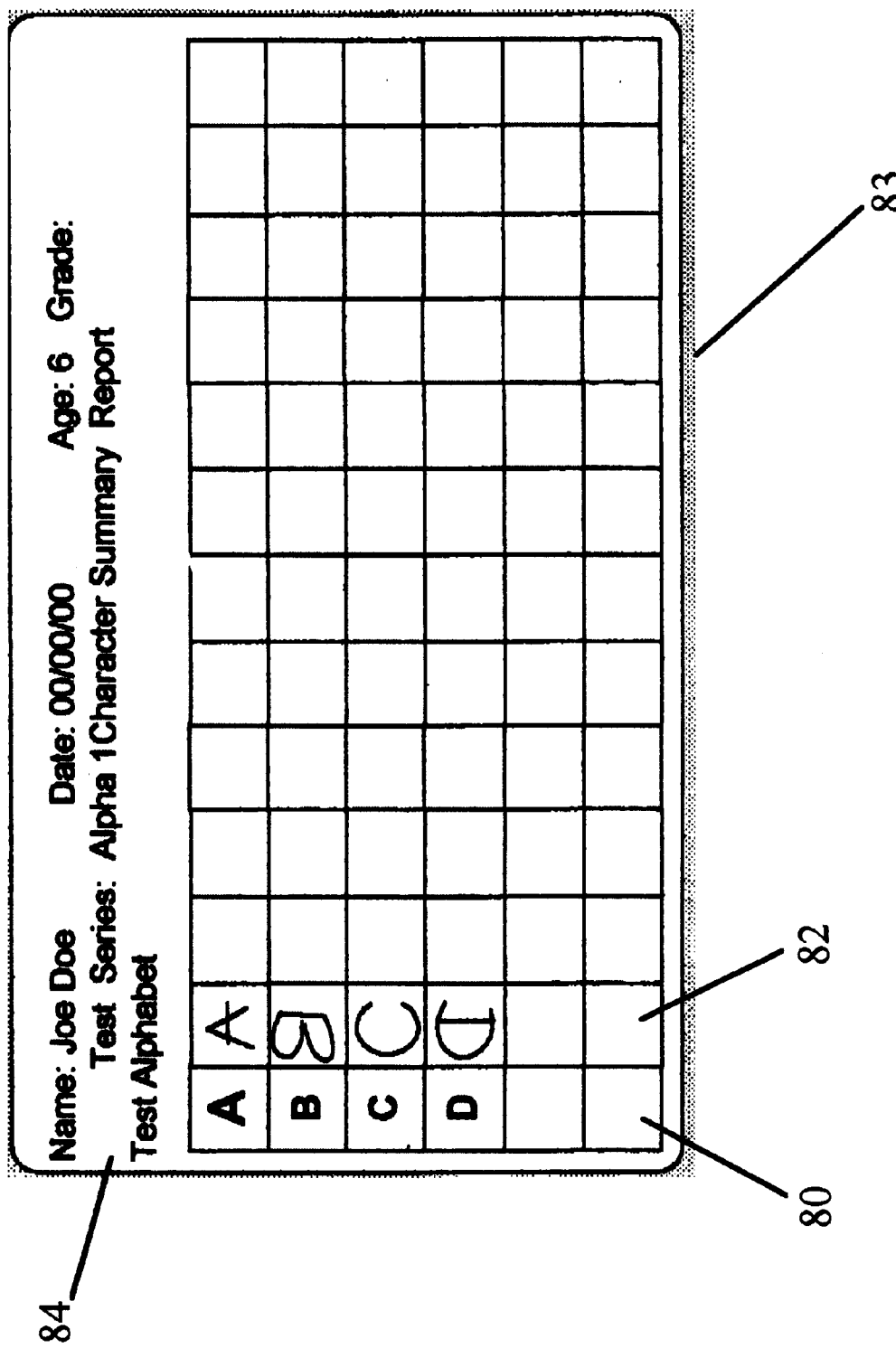
FIG. 6 depicts a reports screen summarizing the test results of a test series by a student.

Referring now to FIG. 6, a report screen 83 summarizes the results of a test session. This screen contains a header 84, in which information about the user appears, including name, date of the exercise, grade level, and the test series used. This screen also shows a column 80 containing the characters presented for duplication. A second column 82 shows the results produced by the student after the first series. Although FIG. 6 shows the results of only one test series, additional series results may appear in columns to the left of column 82, which are blank in this figure.

Referring now to FIG. 7, a different report screen 85 summarizes the results input by the student in response to individual characters, in this case, to the character "B" presented for duplication. This screen contains a header 90 similar to the header of the report screen shown in FIG. 6. Still referring to FIG. 7, a row of characters 86 drawn by the student in successive attempts to reproduce the letter "B" appears. A summary 88 of these attempts appears beneath row 86.

SECOND PREFERRED EMBODIMENT

In a second preferred embodiment the implementation of the current invention is based on a prior art method of character recognition in which a database of legitimate words is included in the system, in addition to a database of legitimate characters.

Figure 3:
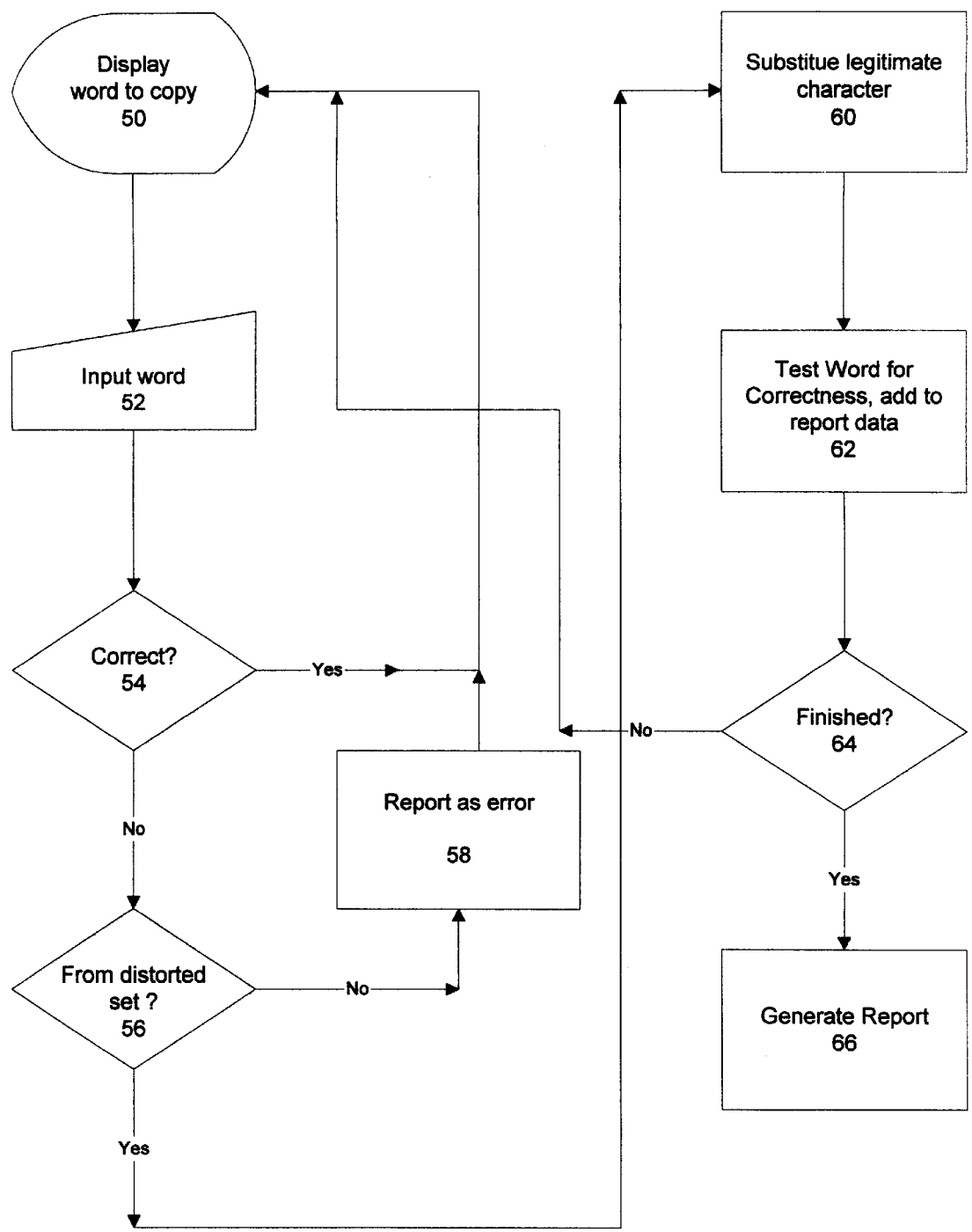
FIG. 3 depicts a flow chart of the second preferred embodiment of the present invention.

Referring now to FIG. 3, The user is presented with a display 50 of words to copy. He then inputs 52 the word presented, and a test 54 is made, using the handwriting pattern recognition system. If the students input is judged acceptable by the system, a new word is displayed 50 for the student to copy, and the process continues. If not, however, the system attempts to determine 56 if any of the characters input by the student are contained in the distorted character set. If they are not, the student's attempt is reported as an ordinary error 58, and control returns to the top of the process 50.

If, however, the characters contained appear as part of the distorted character set, then the corresponding legitimate characters are substituted 60 for the distorted characters. The word input by the student, with legitimate characters substituted for the distorted characters, is tested against the dictionary of acceptable words, and the result is stored as a variant revealing a misperception by the student, for inclusion in the final report.

At the end of each word input, a determination 64 is made as to whether any more test words will be presented to the student. If not, the report or reports 66 will be generated. If not, control returns to the beginning 50 of the process.

THIRD PREFERRED EMBODIMENT

In a third embodiment of the present invention the handwriting analysis is performed in the normal way in accordance with the prior art, except that the characters considered to be errors, or not identifiable, are all stored for subsequent analysis. These unacceptable characters are stored, together with an indication of the character presented to the user which resulted in the unacceptable character.

At the end of the test session, the unacceptable characters are analyzed by the system software to determine if they contain characteristics associated with dyslexia, identifying specific patterns of perceptual dysfunction. The reports generated in this embodiment contain characterizations of the types of errors found. Referring to FIG. 7, the various errors are displayed in column 86. The results of the analysis appear in area 88. As seen in FIG. 7, a separate report may be generated for each different character presented to be written or printed by the student.

The reports will be output either on the screen of the testing device, or may be printed as hard copy for later analysis.

FOURTH PREFERRED EMBODIMENT- DISTORTIONS UNIQUE TO USER

It has been observed that people afflicted with dyslexia will often distort characters in a common manner, as in the case of writing mirror images of characters. These types of distortions will be referred to herein as "global distortions" In addition, many dyslexics will write characters which are unique to that particular person only. The system may be used to detect such distortions in the character sets which are unique to a particular user. When a user makes a mistake by inputting a character which has repeated, consistent characteristics, the character presented for copying, or "true character", together with the misperceived character are stored. These misperceived characters unique to this particular user, are called "local distortion"s. The characteristics of the local distortion are collected over a large number of samples and stored. Average characteristics of the sample are collected, and a typical "local distortion" is compiled. The characteristics of this "local distortion" are defined in the same way as is used for the "true character" in the particular character recognition methodology used by the system.

In this embodiment, the reports are segregated into separate reports which show global distortions, and those which show local distortions.

A database, or library of local distortions will be assembled for each user. Thus, when a particular user logs onto the system, the system will access not only the library of true characters and global distortions, but also the library of local distortions for the particular user who has logged onto the system. In this way, the system in personalized for particular users.

FIFTH PREFERRED EMBODIMENT-CORRECTION OF DISTORTED CHARACTERS

In another embodiment, the characters input by a user will be compared not only to the database of true characters, but also to the libraries of global and local distortions. The character drawn by the user may then be translated back into a "true character" as part of the detection process, and displayed for the user to see. This embodiment is useful in cases where the user is not only making an erroneous drawing of a character, but confusing the character to be copied with another character.

PACKAGING OF THE INVENTION

Because this invention is intended to detect dyslexia in young children, it is especially suitable for incorporation into computer or INTERNET games. Such games require the use of an electronic pad on which to draw characters which then appear on the screen of a computer or similar display. A typical game of this type may involve a simple mimicking of a letter shown on a computer screen, or an attempt to write down a word which is displayed on the screen in a setting where the user has a limited time to copy a sample using the users own handwriting, where the sample disappears after a short period of time. Such computer games, and similar handwriting development programs which uses computers are currently in use in some schools, and will be increasingly available for this purpose.

While the invention has been described with reference to specific embodiments, it will be apparent that improvements and modifications may be made within the purview of the invention without departing from the scope of the invention defined in the appended claims.

I claim:

1. A method for detecting dyslexia in a handwriting pattern recognition system, which includes a database of legitimate characters comprising:

(a) including in the database a set of distorted characters;

(b) presenting a character to be input by a student;

(c) inputting characters by the student;

(d) detecting a correspondence between each input character and one of the distorted characters;

(e) determining a pattern of inputting of characters which correspond to distorted characters; and (f) reporting said pattern.

2. The method of claim 1, wherein the set of distorted characters further comprises mirror images of the legitimate characters.

3. The method of claim 2, wherein each distorted character is associated with a legitimate character, and wherein said reporting further comprises statistical reporting of distorted characters input.

4. The method of claim 3, wherein the set of distorted characters further comprises a subset of global distorted characters and one or more subsets of local distorted characters.

5. The method of claim 4, wherein the subsets of local distorted characters are collected by statistical sampling methods from individual users, and wherein a subset of local distorted characters is associated with each individual user.

6. The method of claim 5, further comprising associating each distorted character with a true character, and reporting the true character together with the distorted character detected.

7. A method for detecting dyslexia in a handwriting pattern recognition system, which includes a database of legitimate characters and words comprising:

(a) including in the database a set of distorted characters;

(b) presenting a word to be input by a student;

(c) inputting words containing characters by a student;

(d) detecting a correspondence between each input character and one of the distorted characters;

(e) determining a pattern of inputting of distorted characters; and (f) detecting a pattern of selection of distorted characters in the words input; and (g) reporting said patterns.

8. The method of claim 7, wherein the set of distorted characters further comprises mirror images of the legitimate characters.

9. The method of claim 8, wherein each distorted character is associated with a legitimate character, and wherein said reporting further comprises statistical reporting of distorted characters input.

10. The method of claim 9, wherein the pattern recognition system further comprises contextually identifying the words input from the database of legitimate words, the method further comprising substituting the legitimate character corresponding to each distorted character detected prior to said contextual identification.

11. The method of claim 10, further comprising determining a pattern of characters which correspond to inputting of distorted characters in certain words; and reporting said pattern.

12. A system for detecting dyslexia in a handwriting pattern recognition system, which includes a database of legitimate characters comprising:

(a) a database of distorted characters;

(b) means for presenting a character to be input by a student;

(c) means for inputting characters by the student;

(d) means for detecting a correspondence between each input character and one of the distorted characters;

(e) means for determining a pattern of inputting of characters which respond to distorted characters; and (f) means for reporting said pattern.

13. The system of claim 12, wherein the database of distorted characters further comprises mirror images of the legitimate characters.

14. The system of claim 13, wherein each distorted character is associated with a legitimate character, and wherein said reporting further comprises statistical reporting of distorted characters input.

15. The system of claim 14, wherein the set of distorted characters further comprises a subset of global distorted characters and one or more subsets of local distorted characters.

16. The system of claim 15, wherein the subsets of local distorted characters are collected by statistical sampling methods from individual users, and wherein a subset of local distorted characters is associated with each individual user.

17. The system of claim 16, further comprising means for associating each distorted character with a true character, and means for reporting the true character together with the distorted character detected.

18. A system for detecting dyslexia in a handwriting pattern recognition system, which includes a database of legitimate characters and words comprising:

(a) a database of distorted characters;

(b) means for presenting a word to be input by a student;

(c) means for inputting words containing characters by a student;

(d) means for detecting a correspondence between each input character and one of the distorted characters;

(e) means for determining a pattern of inputting of characters which correspond to distorted characters; and (f) means for detecting a pattern of selection of distorted characters in the words input; and (g) means for reporting said patterns.

19. The system of claim 18, wherein the set of distorted characters further comprises mirror images of the legitimate characters.

20. The system of claim 19, wherein each distorted character in the database is associated with a legitimate character, and wherein said means for reporting further comprises statistical means for reporting of distorted characters input.

21. The system of claim 20, wherein the pattern recognition system further comprises means for contextually identifying the words input from the database of legitimate words, the system further comprising means for substituting the legitimate character corresponding to each distorted character detected prior to said contextual identification.

22. The system of claim 21, further comprising means for determining a pattern of inputting of characters which respond to words distorted characters in certain words; and reporting said pattern.

23. The system of claim 22, wherein the database of distorted characters, the means for presenting a word to be input by a student, the means for inputting words containing characters by a student, the means for detecting a correspondence between each input character and one of the distorted characters, the means for determining a pattern of inputting of distorted characters, the means for detecting a pattern of selection of distorted characters in the words input, and the means for reporting said pattern are contained within a device chosen from the list consisting of:

computers;

personal digital assistants;

computer games; and a device communicating over a data communications network with an INTERNET server.

\* \* \* \* \*